US005565750A

United States Patent [19]
Padgett

[11] Patent Number: 5,565,750
[45] Date of Patent: Oct. 15, 1996

[54] APPARATUS FOR APPLYING FIELD EXCITATION TO A SYNCHRONOUS ELECTRIC MOTOR

[75] Inventor: Steven A. Padgett, Waukesha, Wis.

[73] Assignee: The Louis Allis Company, Milwaukee, Wis.

[21] Appl. No.: 520,920

[22] Filed: Aug. 30, 1995

[51] Int. Cl.[6] .................................................. H02P 5/40
[52] U.S. Cl. .......................... 318/716; 318/718; 318/712; 318/727; 318/801
[58] Field of Search ..................................... 318/699–836

[56] References Cited

U.S. PATENT DOCUMENTS

| | | | |
|---|---|---|---|
| 4,027,215 | 5/1977 | Knight et al. | 318/341 |
| 4,027,216 | 5/1977 | Rozek | 318/176 |
| 4,489,263 | 12/1984 | Potter et al. | 318/727 |
| 4,509,004 | 4/1985 | Shepard, Jr. | 318/801 |
| 4,591,775 | 5/1986 | Nussel et al. | 318/711 |
| 4,641,074 | 2/1987 | Hamilton, Jr. et al. | 318/706 |
| 4,659,973 | 4/1987 | Stich | 318/718 |

*Primary Examiner*—Paul Ip
*Attorney, Agent, or Firm*—Foley & Lardner

[57] ABSTRACT

The present invention provides a digital circuit for controlling application of DC excitation to the rotor field winding of a synchronous electric motor. The circuit detects the analog slip frequency of the motor and converts the analog signal to a digital signal. A digital timer produces a timing signal after a predetermined time interval. After the frequency of the slip signal has slowed sufficiently, as indicated by the timing signal, a control signal is supplied to a thyristor to gate the thyristor and provide DC excitation to the rotor field winding.

18 Claims, 3 Drawing Sheets

APPARATUS FOR APPLYING FIELD EXCITATION TO A SYNCHRONOUS ELECTRIC MOTOR

FIELD OF THE INVENTION

The present invention generally relates to the field of synchronous electric motors and more particularly to apparatus for applying field excitation to a synchronous electric motor.

BACKGROUND OF THE INVENTION

A synchronous motor generally has a stator winding energized with alternating current (AC) to produce a rotating magnetic field. The motor also generally has a rotor field winding energized with direct current (DC) excitation from an excitation source to produce a unidirectional magnetic field which interacts with the rotating magnetic field to cause the rotor to rotate in synchronism with the AC frequency.

When the synchronous motor is started, the stator winding acts as a primary winding of a transformer and the field winding acts as a secondary winding of the transformer. As a result, high voltages may be induced in the field winding. These high voltages may cause damage to the field winding and associated components.

In order to eliminate the risk of damage, the field winding is shunted through a field discharge resistor during starting. Just before or after synchronization, the field discharge resistor is disconnected from the field winding to avoid current drain from the excitation source through the field discharge resistor.

Such prior art synchronous motors have further generally included a control system for controlling the application of excitation to the motor. The control system includes a field discharge resistance circuit including the field discharge resistor for discharging induced currents in the field winding during the start up period and a DC excitation circuit for energizing the motor field winding at excitation speed in order to develop the torque required to synchronize the motor. Along with the field discharge resistor, the field discharge resistance circuit includes one or more switching devices which selectively couple the field discharge resistor across the field winding. The DC excitation circuit includes the excitation source (or exciter) and one or more switching devices which selectively couple an exciter to the motor field winding. These switching devices all operate in response to control signals.

The prior art control system further includes a detection circuit for determining when the rotor speed is sufficiently close to the speed of the rotating magnetic field for synchronous lock-in to occur. The detection circuit typically detects the slip signal induced in the field discharge resistor. The rotating magnetic field in the stator induces an alternating current in the field winding which is shorted through the field discharge resistor. The induced field current or slip signal initially has a frequency corresponding to the frequency of the alternating current supplied to the stator winding. The frequency decreases as the motor approaches synchronous speed. The detection circuit operates by detecting the AC frequency of the induced rotor field current in the field discharge resistor.

The prior art control system further includes a field application circuit for controlling the application of excitation to the field winding. DC excitation is applied to the field winding as the rotor approaches synchronous speed to pull the rotor into synchronism with the rotating stator magnetic field with minimum rotor slip. Typically, the DC excitation is applied when motor speed is 90–95% of synchronous speed.

When the frequency of the slip signal detected by the detecting circuit falls below a predetermined threshold known as the lock-in-frequency, the detection circuit provides an indication to the field application circuit. In response, the field application circuit provides control signals to the switching devices to decouple the field discharge resistance from the field winding and to couple the exciter to the field winding.

Prior art control systems, including detection circuits, have included analog circuitry for sensing the slip signal, determining the frequency of the slip signal, determining when to apply excitation to the field winding and for providing control signals in the switching devices. Analog circuitry may readily interface with the very large voltages and currents associated with the synchronous motor.

However, the analog circuitry includes devices such as resistors, capacitors and unijunction transistors and has several limitations. Devices such as resistors and capacitors are manufactured to have a specified resistance or capacitance value plus or minus a specified tolerance. Typical tolerances are 5% or 10% or greater. Where several resistors or capacitors are combined to form a circuit which charges or discharges in response to the slip signal or another control signal, the tolerances of these devices combine. This can make it difficult to design a precision circuit capable of precisely detecting the frequency of the slip signal and in response provide the necessary switching signals. Moreover, devices such as resistors and capacitors have temperature sensitivities. Their respective values vary with temperature. Since the operating conditions of the control system cannot be known beforehand, a control system using analog circuitry must be carefully designed to compensate for temperature variations of the devices which form the circuit.

A further disadvantage of prior art analog control systems for synchronous motors is the inability to precisely control the lock-in frequency. Prior art circuits used analog devices such as a trim pot (a variable resistor) or a trim capacitor (a variable capacitor) to vary the frequency of the detected slip signal at which the field discharge resistance is removed from the circuit and excitation is applied. Trim pots and trim capacitors have tolerance and temperature variation problems similar to those described above. Moreover, since the trim pot and trim capacitors are continuously variable, it is difficult to know with precision what pull-in frequency is being set using these devices.

Accordingly, there is a need in the art for an improved apparatus for applying field excitation to a synchronous electric motor. Further, there is a need in the art for a control system for a synchronous motor which overcomes the noted limitations of prior art control systems.

SUMMARY OF THE INVENTION

The present invention provides a circuit for controlling application of DC excitation to the rotor field winding of a synchronous motor. The motor includes a stator winding and a field discharge circuit shunting the field winding when the field discharge circuit conducts a slip signal. The field discharge circuit includes a field discharge resistor having a first end coupled to a first end of the field winding and a second end. The field discharge circuit further includes a diode and a first thyristor in antiparallel relation coupled between the second end of the field discharge resistor and a second end of the field winding. The first thyristor includes a first gate terminal. The motor further includes an exciter for providing the DC excitation and a second thyristor coupled between the exciter and the field winding, the second thyristor including a second gate terminal. The circuit comprises an input circuit coupled to the field discharge circuit for detecting the slip signal and producing a binary input signal having one other first value and a second value. The circuit further comprises timing means for producing a timing signal after a predetermined time interval, the timing means having a reset input for receiving a reset signal, the timing means initiating the predetermined time interval in response to the reset signal. The circuit further comprises a first circuit coupled to the input circuit and the timing means, the first circuit producing a first circuit output signal in response to the timing signal when the binary input signal has the first value, the first circuit providing the reset signal to the reset input in response to the binary input signal. The circuit still further comprises an output circuit coupled to the first circuit, the output circuit being configured to provide a control signal to the second gate terminal in response to the first circuit, the second thyristor applying the DC excitation to the rotor field winding in response to the control signal.

The invention further provides a controller for a synchronous electric motor, the motor comprising a stator winding and a rotor field winding and an exciter for providing DC excitation to the rotor field winding. The control circuit comprises a field discharge circuit configured to be connected across the rotor field winding to conduct a slip signal, the slip signal having a frequency, the field discharge circuit including a field discharge resistor and a first thyristor having a first gate terminal therein. The control circuit further comprises a gate control circuit having an input coupled to the field discharge circuit for receiving the slip signal and an output coupled to the first gate terminal, the gate control circuit providing control signals to the first gate terminal in response to the slip signal, the first thyristor selectively conducting a slip signal in response to the control signals. The controller further comprises a second thyristor having an anode configured to be coupled to the exciter, a cathode configured to be coupled to the rotor field winding and a second gate terminal. The controller still further comprises a control circuit having an input coupled to the field discharge circuit for receiving the slip signal and an output coupled to the second gate terminal, the control circuit providing a control signal to the second gate terminal when the frequency of the slip signal falls below a predetermined value. The control circuit includes an input circuit for detecting the slip signal and producing an input signal. The control circuit further includes a timer which produces a timing signal after a predetermined time interval, the timer having a reset input for receiving a reset signal, the timer initiating the predetermined time internal in response to the reset signal. The control circuit still further includes a first circuit coupled to the input circuit and the timer, the first circuit producing a first circuit output signal in response to the timing signal when the input signal has a predetermined value, the first circuit providing the reset signal to the reset input at a frequency corresponding to twice the slip signal frequency in response to the input signal. The control circuit still further comprises an output circuit coupled to the first circuit, the output circuit being configured to provide the control signal to the second gate terminal in response to the first circuit output terminal.

It is, therefore, an object of the present invention to provide a controller for a synchronous electric motor which employs digital circuitry to allow precise control of the lock-in frequency of the motor during starting of the motor.

it is further object of the present invention to provide a controller having reduced sensitivity to environmental variations such as temperature and manufacturing variations of its constituent components.

It is a still further object of the present invention to provide a controller for a synchronous electric motor which employs standard, off-the-shelf components to reduce the manufacturing costs of the controller and the motor.

BRIEF DESCRIPTION OF THE DRAWING

The features of the invention which are believed to be novel are set forth with particularity in the appended claims. The invention, together with further objects and advantages thereof, may best be understood by making reference to the following description taken in conjunction with the accompanying drawing, in the several figures of which like reference numerals identify identical elements and wherein:

DETAILED DESCRIPTION OF THE PREFERRED EMBODIMENT

Figure 1:
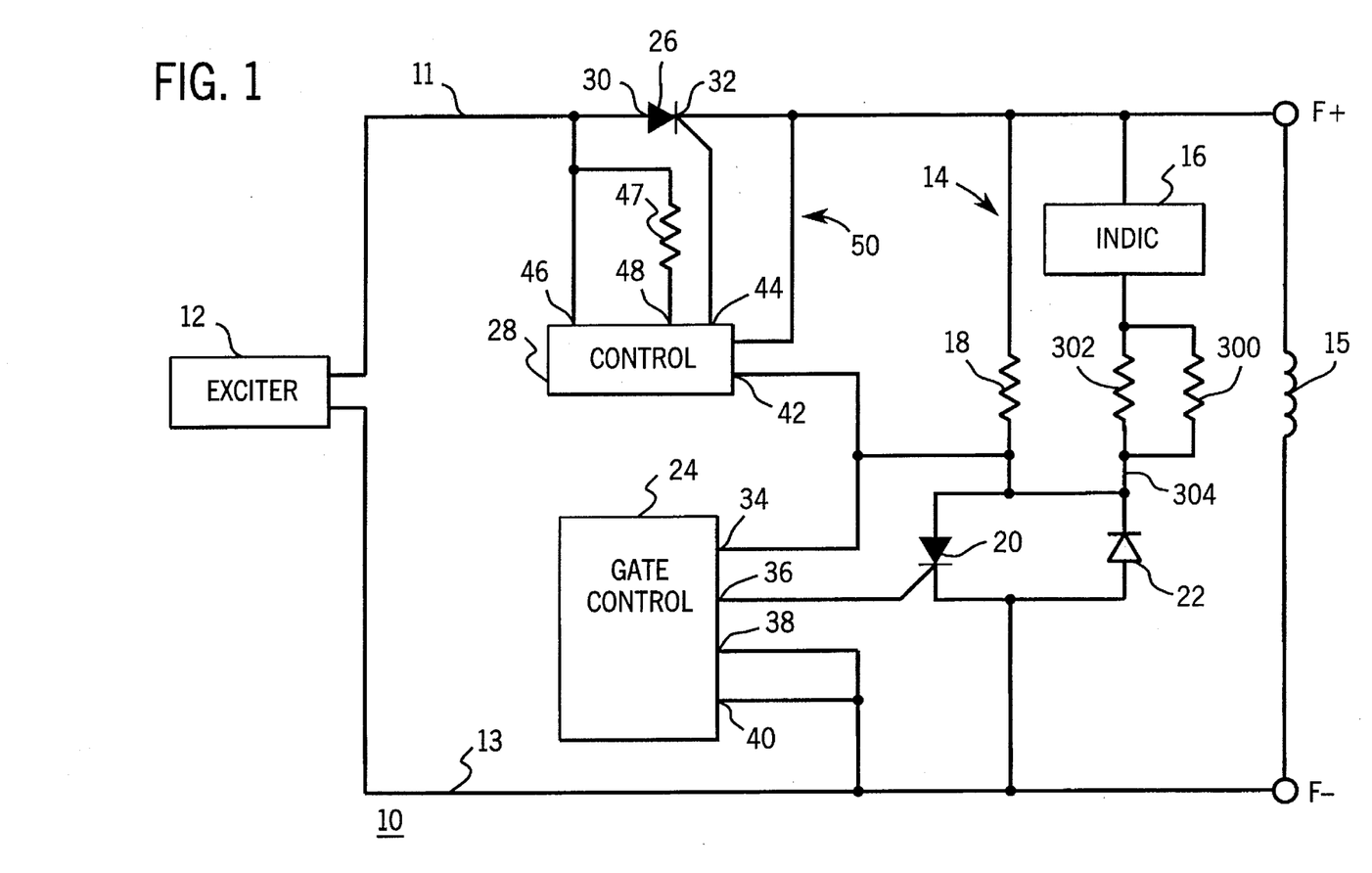
FIG. 1 is a controller for a synchronous motor.

Referring now to FIG. 1, FIG. 1 shows a controller 10 for a synchronous electric motor (not shown). The synchronous motor has a stator and a rotor. The synchronous motor has a stator winding (not shown) energized by a rotating magnetic field and a rotor field winding 15. The rotor field winding 15 is energized with DC power when the speed of the rotor approaches the speed of the rotating magnetic field. Such synchronous motors are well known in the art.

The controller 10 includes an exciter 12 and a field discharge circuit 14 coupled across the rotor field winding 15 of the synchronous motor. The exciter 12 has a positive terminal 21 and a negative terminal 13. The exciter 12 provides DC excitation for the rotor field winding 15. The field discharge circuit 14 includes an indictor 16, a field discharge resistor 18 and a first thyristor 20 and a diode 22 coupled in antiparallel relation. By "antiparallel relation," it is meant that the anode of the first thyristor 20 is coupled to the cathode of the diode 22 and the cathode of the first thyristor 20 is coupled to the anode of the diode 22. The controller 10 further includes a gate control circuit 24, a second thyristor 26 and a control circuit 28. The anode 30 of the second thyristor 26 is coupled to the exciter 12 and the cathode 32 of the second thyristor 26 is coupled to the rotor field winding 15. The controller 10 may further include a diode (not shown) coupled in antiparallel relation with the second thyristor 26.

The gate control circuit 24 has an input 34 coupled to the field discharge circuit 14 between the field discharge resistor 18 and the anode of the first thyristor 20. The gate control circuit 24 further includes an output 36 coupled to the gate of the first thyristor 20. The gate control circuit 24 still further includes a first terminal 38 and a second terminal 40 coupled to terminal F− of the rotor field winding 15. The detailed description of the structure and operation of the gate control circuit 24 will be provided below in conjunction with FIG. 3.

The control circuit 28 includes an input 42 coupled to the field discharge circuit 14 between the field discharge resistor 18 and the anode of the first thyristor 20. The control circuit 28 further includes an output 44 coupled to the gate of the second thyristor 26. The control circuit 28 further includes a first terminal 48 and may include a second terminal 46 coupled to the positive terminal 11 of the exciter 12. The control circuit 28 still further includes a third terminal 50 coupled to the cathode 32 of the second thyristor 26. Detailed operation of the control circuit 28 will be discussed below in connection with FIG. 2.

During starting of the synchronous motor (not shown), the rotor of the motor begins turning and the stator winding (not shown) induces a time varying current in the rotor field winding 15. To prevent damage to the rotor field winding this current is shunted into the field discharge circuit 14. The resultant voltage seen across the field winding 15 may be as large as 1200 volts in amplitude and is typically 600–700 volts peak to peak. This voltage, conducted by the field discharge circuit 14, is known as a slip signal.

On the negative half cycle of the slip signal, the diode 22 of the field discharge circuit 14 is forward biased to conduct the slip signal. On the positive half cycle of the slip signal, the thyristor 20 turns on to conduct the slip signal. To turn on the thyristor 20, the gate control circuit 24 detects the slip signal at the input 34 and provides a control signal at the output 36 to the gate of the first thyristor 20.

The control circuit detects the slip signal and provides a control signal to the gate of the second thyristor 26 to electrically couple the exciter 12 to the rotor field winding 15. The control circuit 28 detects the slip signal at the input 42. As the speed of the rotor approaches the speed of the rotating magnetic field in the stator, the frequency of the slip signal decreases. When the frequency of the slip signal falls below a predetermined threshold known as the lock-in frequency, the control circuit 28 applies a signal at the output 44 to the gate of the second thyristor 26 to turn on the second thyristor 26. Turning on the second thyristor 26 electrically couples the positive output 11 of the exciter 12 to the rotor field winding 15 and applies excitation to the rotor field winding 15. With the second thyristor 26 turned on, a low resistance path is provided from the exciter 12 to the rotor field winding.

Figure 2:
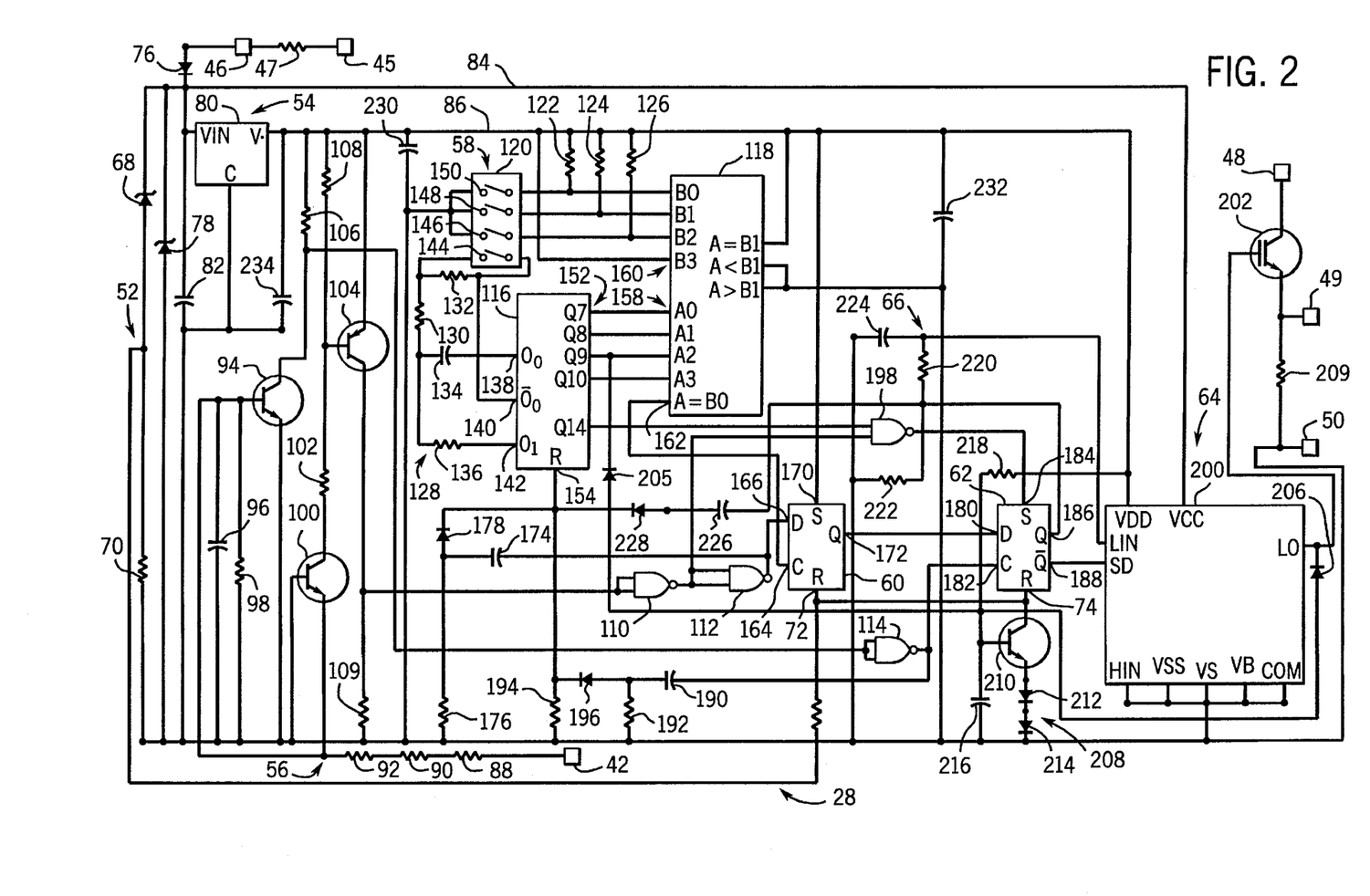
FIG. 2 is a schematic diagram of the control circuit of FIG. 1.

Referring now to FIG. 2, the control circuit 28 includes a power-on reset circuit 52, a voltage regulation circuit 54, an input circuit 56, a timer 58, a first flip flop 60, a second flip flop 62, an output circuit 64 and a delay circuit 66. The power-on reset circuit 52 includes a zener diode 68 coupled through a diode 76 to the first terminal 46 and a resistor 70 coupled to the third terminal 50. The zener diode 68 is preferably a 1N5233B zener diode having a 6 volt zener breakdown voltage. The resistor 70 is preferably a 100K ohm resistor. When power is initially applied to the control circuit 28 between the first terminal 46 and the third terminal 50, the power-on reset circuit 52 applies a reset pulse to the reset input 72 of the first flip flop 60 and the reset input 74 of the second flip flop 62 to ensure that the flip flops 60, 62 are in a known state when the control circuit 28 begins operation.

The voltage regulation circuit 54 includes a zener diode 78, a voltage regulator 80, a current limiting resistor 47, a blocking diode 76 and an electrolytic capacitor 82. The zener diode 78 is preferably a 1N5354B zener diode having a 17 volt zener breakdown voltage. The zener diode 78 current limiting resistor 47 and blocking diode 76 thus charge the electrolytic capacitor 82 to maintain the potential difference between node 84 and the third terminal 50 at or substantially equal to 17 volts. The voltage regulator 80 is preferably a MC78L05AC voltage regulator having a nominal 5 volt DC output voltage. The voltage regulator 80 thus maintains a potential difference of substantially 5 volts between node 86 and the third terminal 50.

The input circuit 56 includes resistors 88, 90, 92 and NPN transistor 94, a capacitor 96, a resistor 98, an NPN transistor 100, a resistor 102, a PNP transistor 104, a resistor 106, a resistor 109 and a resistor 108. The input circuit 56 detects the slip signal received at the input 42. Resistors 88, 90, 92 are preferably 270K ohms each. Resistors 88, 90, 92 reduce the magnitude of the slip signal received at the input 42, which may be on the order of 600–1200 volts, to voltage levels which can be detected by the input circuit 56 without damaging the input circuit 56. The input circuit 56 further includes a first NAND gate 110, a second NAND gate 112 and a third NAND gate 114. The NAND gates have both inputs tied together so they function as inverters and can be replaced by them.

The slip signal received at the input 42 is a generally sinusoidal, time varying signal. The input circuit 56 receives this analog signal and produces digital signals at the outputs of the first NAND gate 110, the second NAND gate 112 and the third NAND gate 114 in response to the signal. During the negative half cycle of the slip signal, the NPN transistor 100 conducts a current through resistors 102 and 108. The voltage drop due to this current through the resistor 108 turns on the PNP transistor 104 causing the PNP transistor 104 to conduct a current through the resistor 109. This current through the resistor 109 causes a voltage drop across the resistor 109 which the first NAND gate 110 detects as a logic 1 input. During the positive half cycle of the slip signal, the NPN transistor 100 substantially does not conduct current. As a result, there is little or no voltage drop across the resistor 108 and the PNP transistor 104 does not turn on. Since the PNP transistor 104 does not turn on, there is little or no voltage drop across the resistor 109, which the first NAND gate 110 detects as a logic 0 input.

Also during the positive half of the slip signal cycle, the NPN transistor 94 turns on, after a delay set by capacitor 96 and resistor 98 conducting a current through the resistor 106. This current produces a voltage drop across the resistor 106 which is detected as a logic 0 input by the NAND gate 114. During the negative half cycle of the slip single, the NPN transistor 94 substantially does not conduct current so that there is little or no voltage drop across the resistor 106. The NAND gate 114 detects this as a logic 1 input. The NAND gate 112 inverts the output of NAND gate 110 to provide a positive logic signal during the negative half of the slip signal cycle.

Thus, the input circuit 56 operates to perform analog-to-digital conversion, converting the analog slip signal at the input 42 to digital signals at the output of the NAND gates 110, 112, 114. In this manner, the input circuit 56 detects the slip signal and produces a binary input signal having one of a first value and a second value, either logic 0 or logic 1.

The NPN transistor 94 and the NPN transistor 100 are preferably 2N3904 NPN transistors. The PNP transistor 104 is preferably a 2N3906 PNP transistor. Resistor 98 is preferably a 33K ohm resistor. Capacitor 96 is preferably a 0.22 µf capacitor. Resistor 102 is preferably a 1000 ohm resistor. Resistors 106, 108 are preferably 100K ohm resistors. The NAND gates 110, 112, 114 are preferably fabricated in a single integrated circuit including four two input NAND gates, such as the commercially available 74HC00 quad two input NAND gate.

The timer 58 produces a timing signal after a predetermined time interval, the duration of which may be varied. Timing of this time interval is reset on each half cycle of the slip signal. The timer 58 includes a counter 116, a comparator 118, a switch circuit 120, a first pull-up resistor 122, a second pull-up resistor 124 and a third pull-up resistor 122, a second pull-up resistor 124 and a third pull-up resistor 126. The counter 116 is preferably a 14 stage ripple binary counter such as the CD74HC4060 counter. The comparator 18 is preferably a four-bit magnitude comparator such as the CD74HC85 comparator. The switch circuit 120 is preferably a four switch DIP switch such as the Grayhill 6SB04S or equivalent and includes four single pole, single throw switches 144, 146, 148, 150. The pull-up resistors 122, 124, 126 are preferably 100K ohm resistors.

The timer 58 further includes a clock source 128. The clock source 128 includes a first resistor 130, a second resistor 132, a capacitor 134 and a third resistor 136. The resistors 130, 132 are preferably 86.6 K ohm resistors and the resistor 136 is preferably a 200 K ohm resistor. The capacitor 134 is preferably a 1000 pF capacitor. The capacitor 134 has a first end connected to a first terminal 138 of the counter 116. The second end of the capacitor 134 is connected to a first end of the resistor 130 and a first end of the resistor 136. The second end of the resistor 130 is connected to a first end of the resistor 132 of the switch 144. The second end of the switch 144 is connected to the second end of the resistor 132 and a second terminal 140 of the counter 116. The second end of the resistor 136 is connected to a third terminal 142 of the counter 116.

The clock source 128 operates in conjunction with the counter 116 to provide a clock signal having a predetermined frequency to the counter 116. By selectively opening or closing the switch 144, the frequency of the clock signal may be varied, for example, between a first value and a second value, the second value being double the frequency of the first value using the values listed above for resistors 130, 132, 136 and capacitor 134.

In response to the clock signal received from the clock source 128, the counter 116 incrementally counts up from a predetermined reset value. The counter 116 has a counter output 152 and a counter reset input 154. The counter output 152 is preferably 4 bits wide and is labelled Q7, Q8, Q9 and Q10 in FIG. 2. As the counter 116 counts, a count value is provided to the counter output 152. In response to a reset signal received at the counter reset input 154, the count value is reset to a predetermined reset value, preferably the four bit binary value 0000 (i.e., four zeroes). The counter 116 further includes a timeout output 156 for providing a timeout signal.

The comparator 118 has a first comparator input 158, a second comparator input 160 and a comparator output 162. The first comparator input 158 is preferably 4 bits wide and is labelled A0, A1, A2, A3 in FIG. 2. Similarly, the second comparator input 160 is preferably 4 bits wide and is labelled B0, B1, B2, B3 in FIG. 1. The comparator output 162 is preferably a single bit output and is used for providing the timing signal. When the 4 bit value present at the first comparator input 158 is equal to the 4 bit value present at the second comparator input 160, the timing signal at the comparator output has the value of logic 1. Otherwise, the timing signal at the comparator output has the value of logic 0. As illustrated in FIG. 2, the comparator 118 may have other outputs providing other indications of the relative magnitudes of the signals provided to the first comparator input 158 and the second comparator input 160. These other outputs are not used in the present embodiment illustrated in FIG. 2.

The switches 146, 148, 150 each have a first end connected to the third terminal 50 of the control circuit 28. The other end of the switches 146, 148, 150 is connected through pull-up resistors 126, 124, 122, respectively, to node 86. Thus, when any one of the switches 146, 148, 150 is open, the pull-up resistor 122, 124, 126 operates to couple that respective bit of the second comparator input 160 to node 86, creating a logic 1 input. When any one of the switches 146, 148, 150 is closed, that respective bit of the second comparator input 160 is coupled to the third terminal 50 of the control circuit 28, creating a logic 0 input. In this manner, the count value at which the timing signal will be produced at the comparator output 162 may be varied.

The first flip flop 60 has a clock input 164 coupled to the comparator output 162 of the comparator 118. The first flip flop 60 further includes a data input 166 coupled to the output of the NAND gate 112. The output of the NAND gate 112 is also coupled through a capacitor 174, a resistor 176 and a diode 178 to the counter reset input 154. The capacitor 174 is preferably a 1000 pF capacitor. The diode 178 is preferably a 1N4248 diode. The resistor 176 is preferably a 100K ohm resistor. The first flip flop 60 further includes a set input 170 coupled to the node 86 and a data output 172.

The second flip flop 62 has a data input 180 coupled to the data output 172 of the first flip flop 60. The second flip flop 62 further includes a clock input 182 coupled to the output of the third NAND gate 114. The output of the NAND gate 114 is also coupled through a capacitor 190, a resistor 192, a resistor 194 and a diode 196 to the counter reset input 154. The capacitor 190 is preferably a 1000 pF capacitor. The diode 196 is preferably a 1N4248 diode. The resistors 192, 194 are preferably 100K ohm resistors. The second flip flop 62 further includes a set input 184 coupled to the output of a fourth NAND gate 198. The fourth NAND gate 198 is preferably integrated in a common integrated circuit with the other NAND gates 110, 112, 114. The fourth NAND gate 198 has a first input coupled to the timeout output 156 and a second input coupled to the output of the first NAND gate 110. The second flip flop 62 further includes a data output 186 and an inverted data output 188.

The output circuit 64 includes a level shifter 200, a transistor 202, a resistor 204, a diode 206 and a reset circuit 208. The level shifter 200 is preferably an integrated circuit high voltage MOS gate driver, such as the IR2110 manufactured by International Rectifier. The level shifter 200 translates the signal from the 5 volt supply and by the input circuit 56, the timer 58, the first flip flop 60 and the second flip flop 62 to the 17 volt supply provided by the voltage regulation circuit 54. The transistor 202 is preferably an insulated gate bipolar transistor rated at 600 volts and 18 amps, such as the IRGBC30S manufactured by International Rectifier. The resistor 204 is preferably a 1000 ohm resistor.

The reset circuit 208 includes an NPN transistor 210, a diode 212, a diode 214, a capacitor 216, a diode 205, a diode 206 and a resistor 218. When the signal applied to the base of the transistor 202 goes to a high voltage level indicating the level shifter 200 has delivered a sufficient gate signal as determined by the counter 116, the reset circuit 208 applies a reset pulse to the reset input 74 of the second flip flop.

The delay circuit 66 includes a resistor 220, a resistor 222 and a capacitor 224. The resistors 220, 222 are preferably 100K ohm resistors. The capacitor 224 is preferably a 0.022 µf capacitor. The delay circuit 66 is coupled to the data output 186 of the second flip flop 62. The data output 186 is also coupled through a capacitor 226 and a diode 228 to the counter reset input 154. The capacitor 226 is preferably a 1000 pF capacitor. The diode 228 is preferably a 1N4148 diode.

To complete the identification of the elements of the control circuit 28 the control circuit 28 includes a capacitor 230, a capacitor 234 and a capacitor 232. These capacitors are preferably 0.1 µf capacitors. These capacitors provide electrical decoupling of the node 86 and the third terminal 50 of the control circuit 28.

In operation, the input circuit 56 receives the slip signal at the input 42 and converts the analog slip signal to a digital signal at the data input 166 of the first flip flop 60. This digital signal is also applied to the counter reset input 154. Thus, on each positive transition of the digital signal produced by the NAND gate 112 (and, correspondingly, on the initial portion of the positive phase of the slip signal at input 42), the counter 116 is reset to the reset value. However, after being reset, the counter 116 continues counting from the reset value in response to the clock signal received from the clock source 128.

When the count value produced by the counter 116 matches the value provided to the second input 160 of the comparator 118, the timer 58 provides the timing signal to the clock input 164 of the first flip flop. This clock signal clocks the logic 1 data input from the input 166 to the data output 172 of the first flip flop 60 and to the data input 180 of the second flip flop 62. If the clock signal received at the clock input 182 of the second flip flop is high, the high data value at the data input 180 will be clocked through the second flip flop to the data output 186 and provided to the output circuit 64.

Thus, two conditions are necessary for the generation of a signal by the second flip flop 62 to cause the output circuit 64 to supply a control signal at output 44 to trigger the second thyristor 26 (FIG. 1). First, the diode 22 of the field discharge circuit 14 must no longer be conducting. This is guaranteed by the logic 0 to logic 1 transition at the output of NAND gate 12 which occurs when the diode 22 stops conducting. This transition also resets the counter 116. Second, the first thyristor 20 of the field discharge circuit 14 (FIG. 1) must not be conducting. This is guaranteed by the logic 1 value at the output of NAND gate 114 which clocks the second flip flop 62. This logic 1 value occurs during the negative phase of the slip signal and before the first thyristor 20 is triggered by the gate control circuit 24 (FIG. 1). The transition of this signal from logic 0 to logic 1 also resets the counter 116.

These two conditions are necessary to ensure proper timing of the application of the control signal to the gate of the second thyristor 26 and excitation of the rotor field winding 15. Because the excitation is a positive DC voltage, the first thyristor 20 must not be conducting when excitation is applied to ensure that the excitation is applied to the field winding 15 and not shunted to ground by the field discharge circuit 14. Excitation is preferably applied at or right after the zero crossing of the slip signal for most efficient operation. The control circuit 28 guarantees that these two conditions are met.

The delay circuit 66 delays the response of the data output 186 of the second flip flop 62. Without the delay circuit 66, the data output 186 of the second flip flop 62 would immediately reset the counter 166 by applying a counter reset signal to the counter reset input 154. The delay circuit 66 delays this response so that the output circuit 64 may provide an output pulse of sufficient time duration to trigger the second thyristor 6 (FIG. 1). The level shifter 200 receives as an input the delayed output from the data output 186 of the second flip flop. The level shifter 200 shifts this input signal from the 5 volts supplied provided at the node 86 to the 17 volts supplied at the node 84. The level shifter 200 provides this output to the transistor 202, turning on the transistor 202 to apply to gating pulse to the second thyristor 26 (FIG. 2).

Figure 3:
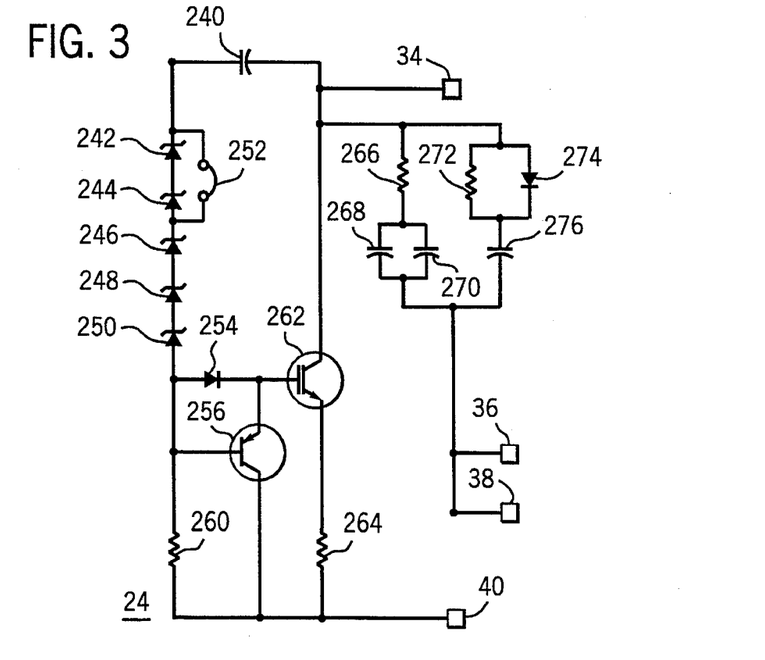
FIG. 3 is a schematic diagram of the gate control circuit of FIG. 1.

Referring now to FIG. 3, it shows a schematic diagram of the gate control circuit 24 of FIG. 1. The gate control circuit 24 includes a capacitor 240 coupled to the input 34, zener diodes 242, 244, 246, 250, jumper 252, diode 254, PNP transistor 256, resistor 260, insulated gate bipolar transistor 262 and resistor 264. The gate control circuit 24 further includes a spike suppression circuit consisting of resistor 266, capacitor 268, capacitor 270, resistor 272, diode 274 and capacitor 276.

The capacitor 240 is preferably a 0.1 µf capacitor. The zener diodes 242, 244, 246, 248, 250 are preferably 1N985A or 1N5271A zener diodes having a 100 volt breakdown voltage. The diode 254 is preferably a 1N4148 diode. The PNP transistor 256 is preferably a 2N3906 or 2N3645 PNP transistor. The resistor 260 is preferably a 4.7K ohm resistor. The resistor 264 is preferably a 1000 ohm resistor. The insulated gate bipolar transistor 262 is preferably rated at 600 volts and 18 amps and may be, for example, an IRGBC30S transistor as supplied by International Rectifier. The resistor 266 is preferably a 150 ohm resistor. The capacitors 268, 270 are preferably 0.1 µf capacitors. The resistor 272 is preferably a 330 ohm resistor, the diode 274 is preferably a 1N5408 diode rated at 1000 volts and 3 amps and the capacitor 276 is preferably a 0.022 µf capacitor.

When the slip signal detected at the input 34 exceeds approximately 300 volts, the insulated gate bipolar transistor 262 turns on and provides a gating pulse or control signal to the date of the first thyristor 20 (FIG. 1). In applications where the field induced in the rotor field winding 15 has a larger value, such as 500 volts, the jumper 252 may be cut to allow the insulated gate bipolar transistor 262 to turn on at the appropriate detected slip signal voltage. The PNP transistor 256 and resistor 260, as well as the circuit including resistors 266, 272, diode 274 and capacitors 268, 270, 276, provides overvoltage and other protection for the insulated gate bipolar transistor 262.

Figure 4:
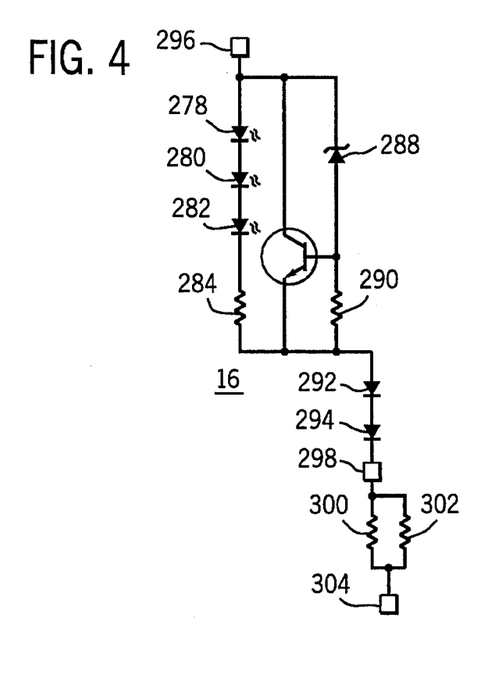
FIG. 4 is a schematic diagram of the indicator circuit of FIG. 1.

Referring now to FIG. 4, it shows a schematic diagram of the indicator circuit 16 of FIG. 1. The indicator circuit 16 includes light emitting diodes 278, 280, 282, a resistor 284, an NPN transistor 286, a zener diode 288, a resistor 290, a resistor 300, a resistor 302 and diodes 292, 294. Light emitting diodes 278, 280, 282 are preferably HLMP-8100 light emitting diodes manufactured by Hewlett Packard. Resistor 284 is preferably a 1000 ohm resistor. The NPN transistor 286 is preferably a TIP41 NPN transistor rated at 5 amps and 40 volts. The zener diode 288 is preferably a 1N965A or 1N5245A zener diode having a 15 volt breakdown voltage. The resistor 290 is preferably a 10K ohm resistor. Diodes 292, 294 are preferably 1N4007 power diodes rated at 1000 volts and 1 amp. Resisters 300 and 302 are preferably 4000 ohm resisters.

The indicator circuit 16 has an input 296 adapted to be coupled to the terminal F+ of the rotor field winding 15 and an output 298 adapted to be coupled to the field discharge resistor 18 (FIG. 1). When the field discharge circuit 14, including the field discharge resistor 18, conducts current, a current is also conducted through the light emitting diodes 278, 280, 282 of the indicator circuit 16 illuminating the light emitting diodes 278, 280, 282. These light emitting diodes 278, 280, 282 thus provide a flashing visual indication of the conduction of the first thyristor 20.

As will be recognized, the indicator circuit 16 could include circuitry which provides any other type of indication of the slip signal conducted by the field discharge circuit 14. The indication could be visible, audible or otherwise. For example, a tone or buzzer could provide an audible indication of the slip signal.

The NPN transistor 286, the zener diode 288 and the resistor 290 provide overvoltage and other protection against damage to the light emitting diodes 278, 280, 282.

As can be seen from the foregoing, the present invention provides a circuit for controlling application of DC excitation to the rotor field winding of a synchronous electric motor. The circuit employs digital circuitry for detecting the slip signal of the motor and for determining when to apply a control signal to trigger a thyristor and apply DC excitation to the motor. The digital circuitry provides improved accuracy and performance over a variety of operating conditions including operating temperature.

While particular embodiments of the present invention have been shown and described, modifications may be made. For example, the first flip flop and the second flip flop may be replaced by any combinatorial or sequential logic which operates in response to the input signal described herein, or similar input signals, to produce the output signals described herein, or similar output signals. Similarly, the counter, comparator and clock circuit of the timer could be replaced by any logic which generates to the same effect. It is therefore intended in the appended claims to cover all such changes and modifications which fall within the true spirit and scope of the invention.

The embodiments of the invention in which an exclusive property or privilege is claimed are defined as follows:

1. A circuit for controlling application of DC excitation to a rotor field winding of a synchronous motor, the motor including a stator winding and a field discharge circuit shunting the field winding when the field discharge circuit conducts a slip signal, the field discharge circuit including a field discharge resistor having a first end coupled to a first end of the field winding and a second end, the field discharge circuit further including a diode and a first thyristor in antiparallel relation coupled between the second end of the field discharge resistor and a second end of the field winding, the first thyristor including a first gate terminal, the motor further including an exciter for providing the DC excitation and a second thyristor coupled between the exciter and the field winding, the second thyristor including a second gate terminal, the circuit comprising:

an input circuit coupled to the field discharge circuit for detecting the slip signal and producing a binary input signal having one of a first value and a second value;

timing means for producing a timing signal after a predetermined time interval, the timing means having a reset input for receiving a reset signal, the timing means initiating the predetermined time interval in response to the reset signal;

a first circuit coupled to the input circuit and the timing means, the first circuit producing a first circuit output signal in response to the timing signal when the binary input signal has the first value, the first circuit providing the reset signal to the reset input in response to the binary input signal; and an output circuit coupled to the first circuit, the output circuit being configured to provide a control signal to the second gate terminal in response to the first circuit output signal, the second thyristor applying the DC excitation to the rotor field winding in response to the control signal.

2. A circuit as recited in claim 1 wherein the circuit further comprises a second circuit coupled to the first circuit and the output circuit, the second circuit having an input for receiving the first circuit output signal and an output for providing a second circuit output signal in response to the first circuit output signal and the binary input signal, the output circuit being configured to provide the control signal to the second gate terminal in response to the second circuit output signal.

3. A circuit as recited in claim 2 wherein the first circuit comprises a first flip flop having a first data input coupled to the input circuit for receiving the binary input signal, a first clock input coupled to the timing means for receiving the timing signal, and a first output coupled to the second circuit.

4. A circuit as recited in claim 3 wherein the second circuit comprises a second flip flop having a second data input coupled to the first output, a second clock input coupled to the input circuit for receiving the binary input signal, and a second output coupled to the output circuit.

5. A circuit as recited in claim 2 wherein the timing means reset input is coupled to the second circuit output for receiving the second circuit output signal, the timing means initiating the predetermined time interval in response to the second circuit output signal.

6. A circuit as recited in claim 5 wherein the circuit further comprises a delay circuit coupled to the second circuit output, the delay circuit delaying receipt of the second circuit output signal by the timing means.

7. A circuit as recited in claim 1 wherein the timing means comprises a counter and a clock source, the clock source having a clock output and producing a clock signal at the clock output, the counter having a clock input coupled to the clock output for receiving the clock signal, a counter output and a counter reset input for receiving the reset signal, the counter producing a binary count at the counter output in response to the clock signal, the counter resetting the binary count in response to the reset signal, the timing means producing the timing signal in response to the binary count.

8. A circuit as recited in claim 7 wherein the timing means further comprises a comparator having a first comparator input, a second comparator input and a comparator output, the first comparator input being coupled to the counter output for receiving the binary count, the second comparator input being configured to receive a frequency setpoint signal, the comparator output being coupled to the first circuit, the comparator producing the timing signal when the binary county equals the frequency setpoint signal.

9. A circuit as recited in claim 8 wherein the timing means further comprises a switch coupled to the second comparator input for selectively setting the frequency setpoint signal.

10. A circuit as recited in claim 7 wherein the clock source is configured to produce the clock signal at one frequency of a plurality of frequencies.

11. A circuit as recited in claim 7 wherein the timing means further comprises a timeout output for providing a timeout signal after a timeout time interval, the timing means initiating the timeout time interval in response to the reset signal, and wherein the output circuit is coupled to the timeout output, the output circuit being configured to provide the control signal to the second gate terminal in response to the timeout signal.

12. A controller for a synchronous electric motor, the motor comprising a stator winding and a rotor field winding and an exciter for providing DC excitation to the rotor field winding, the control circuit comprising:

a field discharge circuit configured to be connected across the rotor field winding to conduct a slip signal, the slip signal having a frequency, the field discharge circuit including a field discharge resistor and a first thyristor having a first gate terminal;

a gate control circuit having an input coupled to the field discharge circuit for receiving the slip signal and an output coupled to the first gate terminal, the gate control circuit providing control signals to the first gate terminal in response to the slip signal, the first thyristor selectively conducting the slip signal in response to the control signals;

a second thyristor having an anode configured to be coupled to the exciter, a cathode configured to be coupled to the rotor field winding and a second gate terminal; and a control circuit having an input coupled to the field discharge circuit for receiving the slip signal and an output coupled to the second gate terminal, the control circuit providing a control signal to the second gate terminal when the frequency of the slip signal falls below a predetermined value, the control circuit including:

an input circuit for detecting the slip signal and producing an input signal;

a timer which produces a timing signal after a predetermined time interval, the timer having a reset input for receiving a reset signal, the timer initiating the predetermined time interval in response to the reset signal;

a first circuit coupled to the input circuit and the timer, the first circuit producing a first circuit output signal in response to the timing signal when the input signal has a predetermined value, the first circuit providing the reset signal to the reset input at a frequency corresponding to the slip signal frequency in response to the input signal; and an output circuit couples to the first circuit, the output circuit being configured to provide the control signal to the second gate terminal in response to the first circuit output signal.

13. A controller as recited in claim 12 wherein the control circuit further includes a second circuit coupled to the first circuit and the output circuit, the second circuit having a data input for receiving the first circuit output signal, a clock input for receiving the input signal, and an output for providing a second circuit output signal in response to the first circuit output signal and the input signal, the output circuit being configured to provide the control signal to the second gate terminal in response to the second circuit output signal.

14. A controller as recited in claim 13 wherein the timer comprises a counter and a clock source, the clock source having a clock output and producing a time varying clock signal at the clock output, the counter having a clock input coupled to the clock output for receiving the clock signal, a counter output and a counter reset input for receiving the reset signal, the counter incrementally counting from a reset value in response to the clock signal and producing a count value at the counter output, the counter resetting the count value to the reset value in response to the reset signal, the timer producing the timing signal in response to the binary count.

15. A circuit as recited in claim 14 wherein the timer further comprises a comparator having a first comparator input, a second comparator input and a comparator output, the first comparator input being coupled to the counter output for receiving the count value, the second comparator input being configured to receive a frequency setpoint value, the comparator output being coupled to the first circuit, the comparator producing the timing signal when the binary count equals the frequency setpoint value.

16. A circuit as recited in claim 15 wherein the timer further comprises a switch coupled to the second comparator input for selectively setting the frequency setpoint value.

17. A circuit as recited in claim 16 wherein the timer further comprises a timeout output for providing a timeout signal after a timeout time interval, the timer initiating the timeout time interval in response to the reset signal, and wherein the output circuit is coupled to the timeout output, the output circuit being configured to provide the control signal to the second gate terminal in response to the timeout signal.

18. A circuit for controlling application of DC excitation to a rotor field winding of a synchronous motor, the motor including a field discharge circuit which shunts the rotor field winding when the field discharge circuit conducts a slip signal, the field discharge circuit including a field discharge resistor, a diode and a first thyristor, the motor further including an exciter for providing the DC excitation and a second thyristor for selectively coupling the exciter to the rotor field winding, the circuit comprising:

an input circuit coupled to the field discharge circuit for detecting the slip signal and producing a binary input signal;

a timing circuit which times a predetermined time interval following receipt of a reset signal and producing a timing signal following the predetermined time interval;

a first circuit which is coupled to input circuit and the timing circuit and which produces a first circuit output signal in response to the timing signal and the binary input signal and which provides he reset signal to the timing circuit; and an output circuit which is coupled to the first circuit and which provides a control signal to the second thyristor in response to the first circuit output signal, the second thyristor applying the DC excitation to the rotor field winding in response to the control signal.

* * * * *